(12) United States Patent
Walsh

(10) Patent No.: US 9,107,140 B2
(45) Date of Patent: Aug. 11, 2015

(54) CARRIER-DRIVEN BEARER PATH SELECTION

(75) Inventor: Matthew J. Walsh, Redmond, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 728 days.

(21) Appl. No.: 12/856,047

(22) Filed: Aug. 13, 2010

(65) Prior Publication Data
US 2012/0039262 A1 Feb. 16, 2012

(51) Int. Cl.
| | | |
|---|---|---|
| *H04W 40/12* | (2009.01) | |
| *H04L 29/06* | (2006.01) | |
| *H04L 12/911* | (2013.01) | |
| *H04L 12/913* | (2013.01) | |
| *H04L 12/54* | (2013.01) | |
| *H04L 12/715* | (2013.01) | |
| *H04L 12/725* | (2013.01) | |
| *H04W 48/18* | (2009.01) | |

(52) U.S. Cl.
CPC ........... *H04W 40/12* (2013.01); *H04L 12/5695* (2013.01); *H04L 45/04* (2013.01); *H04L 45/308* (2013.01); *H04L 47/724* (2013.01); *H04L 47/824* (2013.01); *H04L 65/80* (2013.01); *H04W 48/18* (2013.01)

(58) Field of Classification Search
CPC ... H04L 65/1006; H04L 67/42; H04L 65/104; H04L 65/105; H04L 67/22; H04L 65/1033; H04L 65/1069; H04L 65/4015; H04L 67/02; H04L 67/14; H04L 67/141; H04L 69/08; H04L 12/5695; H04L 47/724; H04L 47/824; H04L 65/80
See application file for complete search history.

(56) References Cited

U.S. PATENT DOCUMENTS

| | | | |
|---|---|---|---|
| 5,577,240 A | 11/1996 | Demers et al. | |
| 5,581,753 A | 12/1996 | Terry et al. | |
| 5,581,754 A | 12/1996 | Terry et al. | |
| 5,603,026 A | 2/1997 | Demers et al. | |
| 5,671,407 A | 9/1997 | Demers et al. | |
| 5,754,543 A * | 5/1998 | Seid .............................. | 370/351 |
| 6,160,796 A | 12/2000 | Zou | |
| 6,557,111 B1 | 4/2003 | Theimer et al. | |

(Continued)

OTHER PUBLICATIONS

Jaokar, Ajit. "How long should we wait for a standard to emerge and what is the cost of doing so?" Published on the Open Gardens Blog [http://www.opengardensblog.futuretext.com/archives/2009/05/how_long_should.html], May 25, 2009, retrieved on Dec. 8, 2010, 9 pages.

(Continued)

*Primary Examiner* — David Oveissi
(74) *Attorney, Agent, or Firm* — Amin, Turocy & Watson, LLP

(57) ABSTRACT

The disclosed subject matter provides for systems, devices, and methods facilitating carrier-driven bearer path selection. Carrier-driven bearer path selection enables a carrier to assert bearer path selection policies. Bearer paths available to UEs can be checked for compliance with a carrier's policies. Preferred bearer paths can be designated to the UE for selection. Designation of preferred bearer paths can, in an aspect, be related to route cost, path requests, or path characteristics. In addition, complex bearer path schema can be determined. In an aspect, complex bearer path schema can include asymmetric routing, bonding, and multiplexing. The subject disclosure can enable a carrier to improve management of the carrier's network resources by driving bearer path selection determination to UEs.

21 Claims, 10 Drawing Sheets

(56) References Cited

U.S. PATENT DOCUMENTS

| | | | |
|---|---|---|---|
| 6,944,662 | B2 | 9/2005 | Devine et al. |
| 7,065,579 | B2 | 6/2006 | Trversat et al. |
| 7,133,669 | B2 | 11/2006 | Nair et al. |
| 7,136,927 | B2 | 11/2006 | Trversat et al. |
| 7,167,920 | B2 | 1/2007 | Trversat et al. |
| 7,206,841 | B2 | 4/2007 | Trversat et al. |
| 7,308,472 | B2 | 12/2007 | Hasegawa |
| 7,330,444 | B1 | 2/2008 | Pasqua |
| 7,340,500 | B2 | 3/2008 | Trversat et al. |
| 7,401,152 | B2 | 7/2008 | Trversat et al. |
| 7,401,153 | B2 | 7/2008 | Trversat et al. |
| 7,466,810 | B1 | 12/2008 | Quon et al. |
| 7,519,364 | B2 | 4/2009 | Nair et al. |
| 7,525,933 | B1 | 4/2009 | Hall |
| 7,533,172 | B2 | 5/2009 | Trversat et al. |
| 7,574,523 | B2 | 8/2009 | Trversat et al. |
| 7,802,001 | B1 | 9/2010 | Petry et al. |
| 7,814,218 | B1 | 10/2010 | Knee et al. |
| 7,970,918 | B2 | 6/2011 | Thompson et al. |
| 8,238,911 | B2 | 8/2012 | D'Amore et al. |
| 8,386,610 | B2 | 2/2013 | Yahalom et al. |
| 2005/0149754 | A1* | 7/2005 | Rasanen ............ 713/201 |
| 2006/0047830 | A1 | 3/2006 | Nair et al. |
| 2009/0041223 | A1* | 2/2009 | Agarwal et al. ...... 379/211.02 |
| 2009/0304015 | A1* | 12/2009 | Willars et al. ........... 370/412 |
| 2010/0142368 | A1* | 6/2010 | Gunukula et al. ....... 370/217 |
| 2010/0220640 | A1* | 9/2010 | Slack ................... 370/311 |
| 2011/0029988 | A1 | 2/2011 | Mittal et al. |

OTHER PUBLICATIONS

Sauter, Martin. "Voice—Bearer Aware, Bearer Adaptive or Bearer Agnostic?" Published on the WirelessMoves Blog [http://mobilesociety.typepad.com/mobile_life], Jun. 5, 2009, retrieved on Dec. 8, 2010, 2 pages.

"Xerox PARC's Bayou Project". Http://www2.parc.om/csl/projects/bayou. Last accessed on Apr. 6, 2010, 7 pages.

W. Keith Edwards, et al. Designing and Implementing Asynchronous Collaborative Applications with Bayou. Last accessed on Apr. 7, 2010, 10 pages.

"Thoughts on Flash". Http://www.apple.com/hotnews/thoughts-on-flash. Last accessed on Apr. 29, 2010, 4 pages.

Jini TM Architecture Specification. Sun Microsystem. Last accessed on Apr. 1, 2010, 26 pages.

OA dated Sep. 11, 2012 for U.S. Appl. No. 12/783,474, 35 pages.

Demers, et al. "The Bayou Architecture: Support for Data Sharing among Mobile Users", Proceedings of the 1994 First Workshop on Mobile Computing Systems and Applications, 6 pages.

Wikipedia. "General Magic", published online at [http://en.wikipedia.org/wiki/General_Magic], retreived Jan. 27, 2013, 3 pages.

Tardo, et al. "Mobile Agent Security and TeleScript", Proceedings of the 41st IEEE International Computer Conference, 1996, 6 pages.

Nakagawa. "Server-Less Programming: A simple and easy programming framework for 'device+cloud' computing model", published online at [http://live-e.naist.jp/sensor_overlay/5/doc/nakagawa.pdf], dated Oct. 2011, retrieved Apr. 6, 2013, 27 pages.

Nakagawa. "Dripcast: Server-less Java programming framework for Device Applications", published online at [http://blog.livedoor.jp/techblog/techsemi/techcon120519-dripcast.pdf], dated May 2012, retrieved Apr. 6, 2013, 24 pages.

Nakagawa. "Challenge of cloud platform technology—changing communication style", published online at [http://mpls.jp/2011/presentations/111024-mpls-japan-print.pdf], dated Oct. 2011, retrieved Apr. 6, 2013, 27 pages.

Office Action dated Sep. 12, 2013 for U.S. Appl. No. 13/915,421, 29 pages.

* cited by examiner

CARRIER-DRIVEN BEARER PATH SELECTION

BACKGROUND

Modern communication devices typically have mechanisms for communicating over a variety of communications pathways. These communications pathways can comprise a large plurality of communication path segments that can be linked together in a variety of ways to effect a communication path that will bear communicative traffic. These various permutations comprising communication segments can be known as bearer paths. A simple example of a bearer path segment can be a string stretched tight between two cans, the string carrying the vibrations of a voice spoken into one can across the string to the other can. More complex examples of bearer path segments can include the various interconnections of copper wire in old POTS (plain old telephone system) exchanges, hops across various routers in an IP system, wireless links in a cell phone network, wireless links in an WLAN system, fiber lines running across the ocean floor, copper power lines in a PowerLine-type LAN system, radio links between HAM operators, or any other medium that can bear communicative content or data.

Typically, the selection of a bearer path is delegated, at least in part, to a communicating device or the user of a communication device. As a basic example, a modern smartphone can select among an Enhanced Data rates for GSM (Global System for Mobile Communications) Evolution (EDGE) cellular link, a 3G (3rd Generation) cellular link (including 3rd Generation Partnership Project (3GPP) technologies), a WiFi link (IEEE 802.11 or other wireless LAN links), etc., when sending or receiving information. Generally, modern devices are merely programmed to select from the available bearer paths in a predefined preferential order based on availability, e.g., where WiFi is available, data is preferentially routed on WiFi rather than a 3G bearer path segment regardless of the actual performance of the bearer path segments. This can result in sub-optimal selections of a bearer path where the actual performance of a bearer path segment departs from the anticipated performance. Continuing the previous example, where the WiFi bearer path segment is selected by the smartphone, if the WiFi link is heavily burdened, the 3G bearer path segment could have provided superior performance. A user can also generally interact with a device to, at least in part, designate a bearer path, e.g., the user can turn off the WiFi radio in the exemplary smartphone and the smartphone will then typically revert to a 3G bearer path segment selection where WiFi is no longer available. Generally, the selection mechanisms in modern user equipments (UEs) can often be associated with sub-optimal performance.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed subject matter provides for systems, devices, and methods employing carrier-driven bearer path selection features. Where a plurality of bearer paths are accessible by a UE, various criteria, including bearer path criteria, can be analyzed with regard to carrier policies such that the carrier can drive the selection of a conforming bearer path. For example, where a UE has WiFi, 3G and EDGE bearer path segments available, a communications carrier (including a telecommunications carrier) policy can be to select the bearer path incorporating the 3G segment between the hours of 9 pm and 3 am UE local time. A second example can be that the bearer path incorporating the 3G segment can be selected when the UE is determined to be moving above 7 miles per hour (e.g., movement can be determined from location data and employed in determining bearer path selection). As used herein, the term UE includes any user-centric equipment and is not intended to limit the subject disclosure to any one particular industry interpretation of the term, as such, UEs can include laptop computers, televisions, cell phones, smartphones, compact disc players, MP3 players, automobiles, printers, hard drives, appliances (washer, dryer, refrigerator, etc.), pagers, baby monitoring equipment, dog collars, or nearly any other piece of user-centric equipment that can embody aspects of the disclosed subject matter.

In an aspect, carrier-driven bearer path selection policy compliance can be performed external to a UE and a bearer path selection can be communicated to the UE. For example, performance data for communication across a plurality of bearer paths can be determined and updated with a carrier. The carrier can then employ a policy engine to designate a conforming bearer path and make the designation accessible by the UE. The UE can then select the designated bearer path for communication.

In a further aspect, carrier-driven bearer path selection policy compliance can be performed internal to a UE. For example, a policy engine can facilitate access by UEs to relevant bearer-path selection policies. A UE can access relevant policies when determining the selection of a conforming bearer path. This can, for example, allow regular updating of carrier policies for bearer path selection. For example, in highly congested 3G-network regions, a carrier can designate access to the 3G network for only a subset of UEs, such as only allowing Emergency Responder UEs access to 3G bearer path segments during a natural disaster or other emergency.

Certain illustrative aspects of the disclosed innovation are described herein in connection with the following description and the annexed drawings. These aspects are indicative, however, of but a few of the various ways in which the principles disclosed herein can be employed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
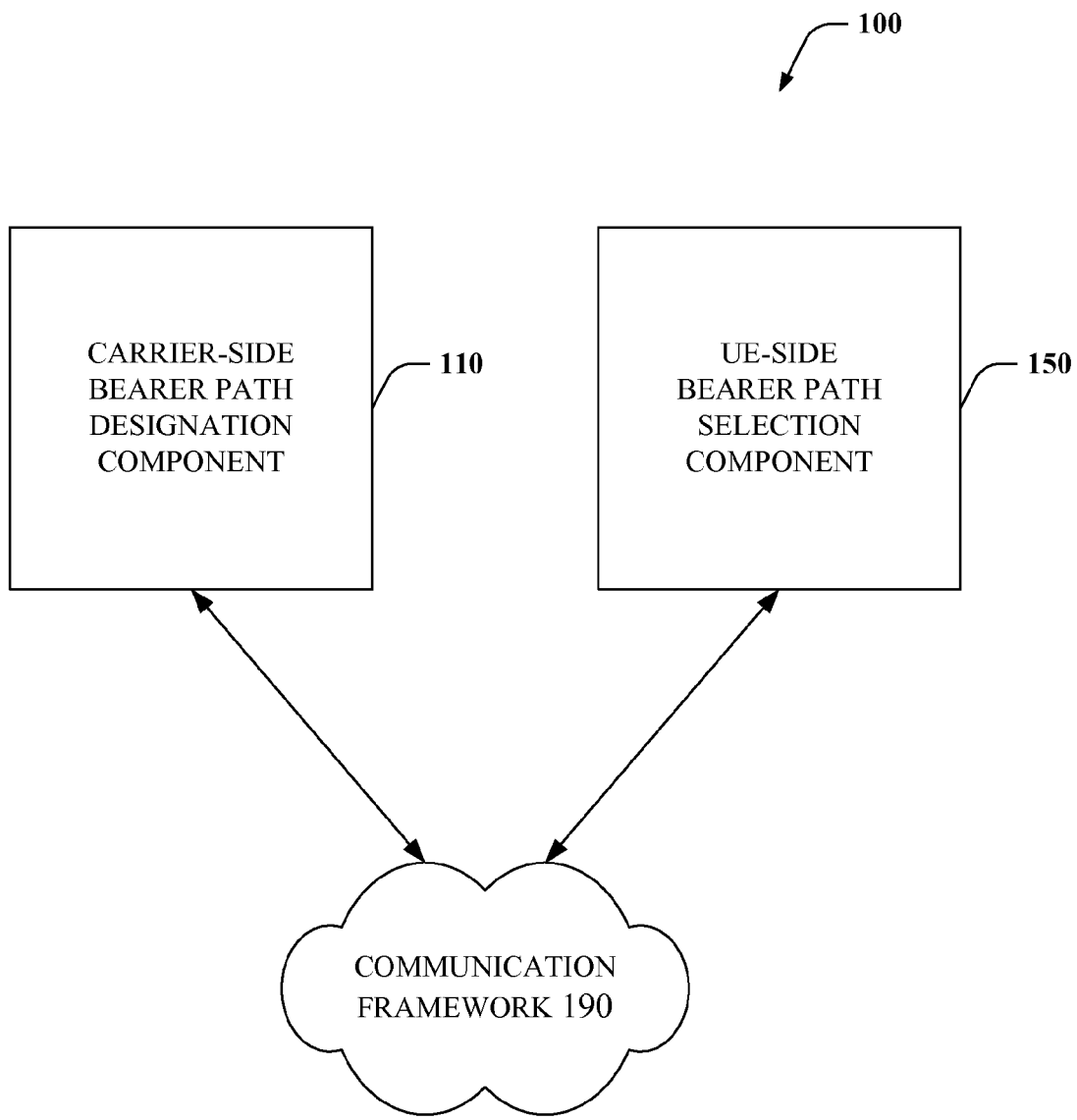
FIG. 1 illustrates an exemplary system that facilitates carrier-driven bearer path selection in accord with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It will be appreciated by one of skill in the art that a communication network for systems described herein can include any suitable mobile and/or landline based circuit-switched communication network including a GSM network, a time division multiple access (TDMA) network, a CDMA network, such as IS-95 and subsequent iterations of CDMA technology, an integrated digital enhanced network (iDEN) network and a public switched transport network (PSTN). Further examples of a communication network can include any suitable data packet-switched or combination data packet/circuit-switched communication network, e.g., a wired or wireless internet protocol (IP) network such as a voice over internet protocol (VoIP) network, an IP data network, a universal mobile telecommunication system (UMTS) network, a general packet radio service (GPRS) network, and other communication networks that provide streaming data communication over IP and/or simultaneous voice and data communication over combination data packet/circuit-switched technologies.

Similarly, one of skill in the art will appreciate that a communication device for systems disclosed herein can include a mobile device, mobile phone, a PSTN phone, a cellular communication device, a cellular phone, a smartphone, a satellite communication device, a satellite phone, a VoIP phone, a WiFi phone, a dual-mode cellular/WiFi phone, a combination cellular/VoIP/WiFi/WiMAX phone or any suitable combination thereof. Specific examples of a mobile device can include cellular devices such as GSM, TDMA, CDMA, IS-95 and iDEN phones and cellular/WiFi devices such as dual-mode GSM, TDMA, IS-95 or iDEN/VoIP phones, UMTS phones UMTS VoIP phones, or like devices or combinations thereof. In support of mobile devices a gateway routing component of such a system can include any suitable component that can perform centralized routing within a mobile, satellite, or similar network, routing between communication networks, between networks of varying architecture (e.g., between PSTN, GSM, UMTS, Enterprise VoIP, the Internet, or combinations thereof), or the like. Specific examples of a gateway routing component can include a GMSC, a gateway GPRS support node (GGSN), a session border control (SBC) device, or like devices. Additionally, a data storage component of such a system can include any suitable device, process, combination device and process, etc., that can store digital and/or switched information (e.g., server, database, data store, or the like).

FIG. 1 depicts an exemplary system 100 that facilitates carrier-driven bearer path selection in accord with aspects of the disclosed subject matter. System 100 can include carrier-side bearer path designation component 110. Carrier-side bearer path designation component 110 can facilitate designating a bearer path for user equipments (UEs). Carrier-side bearer path designation component 110 can be communicatively coupled to UE-side bearer path selection component 150 by way of communication framework 190. Communication framework 190 can include wired interfaces, wireless interfaces, or both. It will be appreciated that communications framework 190 can comprise cellular networks, IP-networks, LANS, WANS, WLANS, X.25 systems, Power-Line-type systems, Bluetooth connections, WiFi connections, CB-radio connections, broadcast television or radio connections, or nearly a limitless number of other communications modalities. A non-limiting example of a communications framework can be a cellular network associated with a cellular service carrier.

System 100 can further include UE-side bearer path selection component 150. UE-side bearer path selection component 150 can facilitate selecting a bearer path at a UE. In an aspect, the selection of a bearer path can be based, at least in part, on bearer paths designated by carrier-side bearer path designation component 110. For example, UE-side bearer path selection component 150 can select a bearer path having an EDGE cellular bearer path segment in accord with a carrier-side designation that the bearer path including the EDGE path segment is favorable over other bearer paths available to the UE.

In accordance with an aspect of the disclosed subject matter, carrier-side bearer path designation component 110 can reflect one or more bearer path selection policies of the carrier. The carrier-side bearer path designation component 110 can compare bearer paths to the policies to determine a preferred ordering of the bearer paths. As will be appreciated by one of skill in the art, the selection policies employed in ranking the bearer paths can be exceedingly simple to highly complex and can include nearly any type of criteria. As a simple non-liming example, a policy can be to select a bearer path having a 3G path segment as a default bearer path selection. A more complex non-liming example can be a policy to select a bearer path having a 3G path segment when an available bearer path having a WiFi path segment is operating at rate less than 100 kb/sec. These exemplary policies can become more complex by including other criteria, for example, criteria relating to a subscription plan, resource usage history, type/amount of data to be borne on a bearer path, priority of data to be borne on a bearer path, UE location information, equipment information, network resource information, competing resource information, security/privacy criteria, environmental criteria, business goal criteria, etc. It will further be appreciated that policies can be combined, separated, ordered, employed iteratively or recursively, concatenated, or otherwise adapted to form other policies that can be employed in carrier-driven bearer path selection.

In a further aspect in accordance with the disclosed subject matter, carrier-side bearer path designation component 110 can facilitate access to carrier policies relating to bearer path selection. System 100 components other than carrier-side bearer path designation component 110 can therefore employ carrier-side policy when ranking available bearer paths. This can enable compliance with a carrier policy even where the ranking of bearer paths can be conducted external to carrier-side bearer path designation component 110. As a non-limiting example, up-to-date carrier policy for bearer path designation can be accessed by a femto-cell base station. The ranking of available bearer paths can then be conducted at the femto-cell base station such that they are in accord with the carrier policies. As a UE communicates with the femto-cell base station to set up a communications session (for example, to check email on a smartphone through the femto-cell base station), a bearer path can be designated based on the carrier's current bearer path selection policies. In this non-limiting example, the preferred bearer path can be to employ Bluetooth to communicate with the femto-cell base station and a LAN connection to internet servers to access the mail services. This designated bearer path can be favored because it keeps 3G and EDGE resources from being consumed.

In another aspect of the disclosed subject matter, carrier-driven bearer path selection can employ complex bearer paths. A complex bearer path can comprise asymmetric routing across bearer paths, bonding bearer path resources together, multiplexing across bearer path resources, etc. For example, while a voice communication can be borne both in and out on a bearer path having an EDGE path segment, it can be just as feasible to bear the voice communication outbound portion on a bearer path having a 3G path segment while the inbound portion can be borne on a bearer path having a WiFi path segment. As another non-limiting example, a voice and data communication (for example videoconferencing) can bear the voice portion over a bearer path having an EDGE path segment while the data portion for still images (e.g., slides, etc.) is borne on a bearer path having a 3G segment and the data portion for active images (e.g., video) is borne on a bearer path having a Bluetooth path segment and 802.11(b) path segment bonded together for greater throughput. One of skill in the art will appreciate that numerous other examples of complex bearer path schema are possible and all are within the scope of the present disclosure.

Figure 2:
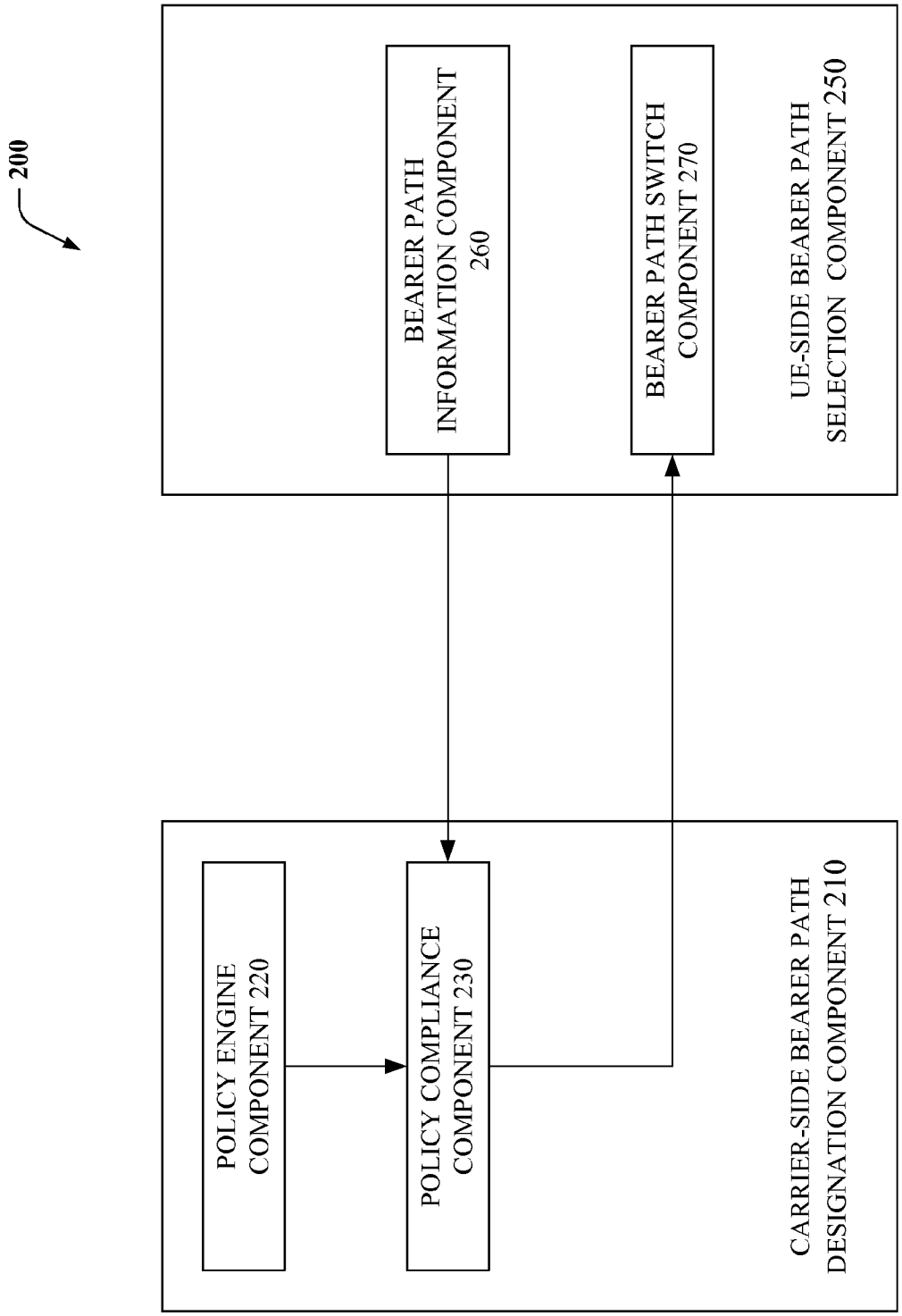
FIG. 2 depicts an exemplary system that facilitates carrier-driven bearer path selection in accord with aspects of the disclosed subject matter.

FIG. 2 depicts an exemplary system 200 that facilitates carrier-driven bearer path selection in accord with aspects of the disclosed subject matter. System 200 can include carrier-side bearer path designation component 210. Carrier-side bearer path designation component 210 can be the same as, or similar to, carrier-side bearer path designation component 110. Carrier-side bearer path designation component 210 can be communicatively coupled to UE-side bearer path selection component 250 by way of a communication framework (not illustrated) which can be the same as, or similar to, communications framework 190. UE-side bearer path selection component 250 can be the same as, or similar to, UE-side bearer path selection component 150.

Carrier-side bearer path designation component 210 can facilitate designating bearer paths for UEs. Carrier-side bearer path designation component 210 can include policy engine component 220. Policy engine 220 can facilitate access to carrier-based policies related to bearer path designation. As disclosed herein, these policies can include policies from the most basic to the most complex. Further, as disclosed herein, these policies can be based on criteria related to almost any aspect of the communications process, carrier business enterprise, market forces, user, equipment, etc. In an aspect, policy engine component 220 can generate and/or source policies related to designating priority levels for one or more bearer paths, or portions thereof. As such, bearer paths can be ordered in terms of preference to facilitate selection of a favored bearer path as driven by the carrier's policies. As a non-limiting example, a carrier can be federally mandated to provide Emergency Responders with service during a natural disaster. The carrier can set criteria such that the policy engine sources a policy that downgrades all Non-Emergency Responder bearer paths to paths including EDGE network path segments and upgrades all Emergency Responder bearer paths to those having 3G path segments, where available, during a natural disaster. In daily use the policy may not be triggered and UEs can use the 3G network regardless of Emergency Responder status, however, when a natural disaster is indicated, the 3G resources can be preserved for designated Emergency Responder UEs by driving the policy across a carrier's subscribers or those accessing a carrier's resources.

System 200 can further include policy compliance component 230 in accord with aspects of the disclosed subject matter. Policy compliance component 230 can be communicatively coupled to policy engine component 220. As such, policy compliance component 230 can access policies by way of policy engine component 220. Policy compliance component 230 can aid in determining if a bearer path complies with a given policy. In an aspect, this compliance can also include ranking bearer paths as disclosed herein. As such, an identified bearer path for a UE can be analyzed for compliance with one or more carrier bearer path policies and be ranked such that favored bearer paths can then be selected by the UE.

UE-side bearer path selection component 250 can include bearer path information component 260. Policy compliance component 230 can be communicatively coupled to bearer path information component 260. Bearer path information component 260 can facilitate access to bearer path related information. Bearer path information can comprise bearer path identification, bearer path characteristic(s), bearer path cost-of route (COR) information pertaining to the content to be borne, feature requests for designated bearer paths, and requests for specific bearer paths or portions thereof, etc. For example, a bearer path information can include an identification of an available AM radio band, an identification of a low priority status for a background update of a news headline RSS feed for an application on a smartphone, and a request that any designated bearer path be available within the next 60 minutes. As another non-limiting example, a bearer path information can include identification of 3G, EDGE, WiFi, and PowerLine-type interfaces, a request for a high security bearer path, identification of a high bandwidth but short burst data payload, and a request that a specific bank or financial institution's server be included in any designated bearer path. One of skill in the art will appreciate that a wide variety of information relating to bearer paths, UE environments for use of a bearer path, requested bearer path features, content to be borne, etc., can be made accessible by way of bearer path information component 260 and that all such information is within the scope of the present disclosure.

In an aspect, where bearer path information component 260 is communicatively coupled to policy compliance component 230, information relating to the bearer paths and bearer path conditions to be selected can be compared to carrier policies. This can result in ranked lists of bearer paths to drive the bearer path selection process on a UE. As a non-limiting example, where a policy designated low priority data transfers to an EDGE network connected bearer path, a background RSS feed can be designated to select an EDGE bearer path even where a 3G connection and WiFi connection are available. As another non-limiting example, where a secure bearer path is requested, a secure bearer path can be designated as having higher priority than unsecure bearer paths that may be available even where the unsecure bearer paths would otherwise have had higher priority than the secured bearer path.

UE-side bearer path selection component 250 can include bearer path switch component 270. Bearer path switch component 270 can facilitate selection of a bearer path at a UE. Selection of a bearer path at a UE by bearer path switch component 270 can be based, at least in part, on compliance and ranking information for a bearer path as disclosed herein. Compliance and ranking information can be accessed by way of policy compliance component 230 also as disclosed herein. As a non-limiting example, bearer path switch component 270 can select, at the UE, a bearer path comprising an EDGE path segment in response to the designation of such a bearer path as preferential by policy compliance component 230, said designation being based, at least in part, on a carrier policy sourced from policy engine component 220 and, at least in part, on bearer path information accessed by way of bearer path information component 260.

Figure 3:
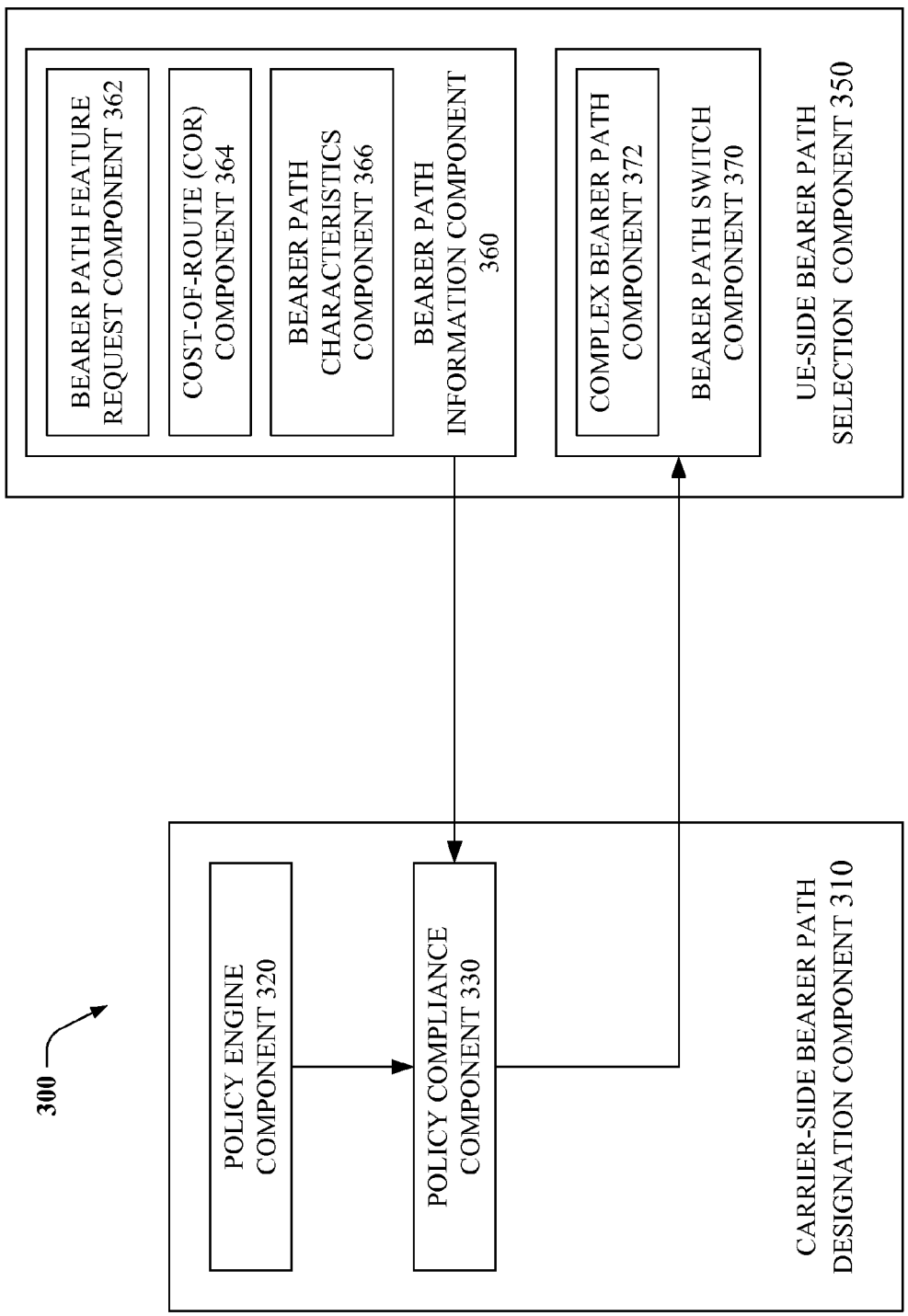
FIG. 3 illustrates an exemplary system that facilitates carrier-driven bearer path selection in accord with aspects of the disclosed subject matter.

FIG. 3 depicts an exemplary system 300 that facilitates carrier-driven bearer path selection in accord with aspects of the disclosed subject matter. System 300 can include carrier-side bearer path designation component 310. Carrier-side bearer path designation component 310 can be the same as, or similar to, carrier-side bearer path designation components 110, 210. Carrier-side bearer path designation component 310 can be communicatively coupled to UE-side bearer path selection component 350 by way of a communication framework (not illustrated) which can be the same as, or similar to, communications framework 190. UE-side bearer path selection component 350 can be the same as, or similar to, UE-side bearer path selection components 150, 250.

Carrier-side bearer path designation component 310 can facilitate designating bearer paths for UEs. Carrier-side bearer path designation component 310 can include policy engine component 320. Policy engine 320 can source carrier-based policies related to bearer path designation as disclosed herein. Further, as disclosed herein, these policies can be based on criteria related to almost any aspect of the communications process, carrier business enterprise, market forces, user, equipment, etc. As such, bearer paths can be ordered in terms of preference to facilitate selection of a desirable bearer path as driven by the carrier's policies.

Carrier-side bearer path designation component 310 can further include policy compliance component 330 in accord with aspects of the disclosed subject matter. Policy compliance component 330 can be communicatively coupled to policy engine component 320. As such, policy compliance component 330 can access policies by way of policy engine component 320. Policy compliance component 330 can determine a level of compliance for a given bearer path with a set of carrier policies and can assign a preference ranking for bearer paths, as disclosed herein, to facilitate selection of favored bearer paths at UEs.

UE-side bearer path selection component 350 can include bearer path information component 360. Policy compliance component 330 can be communicatively coupled to bearer path information component 360. Bearer path information component 360 can facilitate access to bearer path related information as disclosed herein. Bearer path information component 360 can include bearer path feature request component 362, cost-of-route component 364, bearer path characteristics component 366, or combinations thereof.

Bearer path feature request component 362 can source information related to requested features of a yet to be selected bearer path. Requested feature information can be employed as criteria when examining bearer path compliance with carrier policies. It can be desirable for a UE to seek a particular set of features for a bearer path, or even to seek a specific bearer path, when communicating content. As a non-limiting example, it can be desirable for a credit card processing machine tethered to a cellular phone to select a bearer path that is highly secure and, for example, avoiding bearer paths including foreign servers to help reduce the possibility of data packet sniffing. The exemplary credit card machine can request, by way of bearer path feature request component 362, that bearer paths without foreign server segments be designated. A user can desire to specifically select or request a bearer path or bearer path feature(s), for example, requesting a bearer path that uses a tethered 3G-enabled cell phone rather than using a WiFi network in a hotel. UEs can also facilitate imparting user preferences in the bearer path selection process (e.g., user profiles, histories, preferences, etc.) Continuing the example, a user can request (for example by depressing a UE button, selecting an icon on a UE touch screen, by way of a stored user profile, employing an inference engine, etc.) bearer path features, by way of bearer path feature request component 362, such that a designated bearer path can include 3G path segments and/or exclude bearer paths inclusive of the hotel's WiFi path segment. Requests for bearer path features can be generated by a variety of mechanisms, as will be appreciated by one of skill in the art, and all such mechanisms are within the scope of the present disclosure.

Cost-of-route (COR) component 364 can facilitate access to route cost information. COR information can be employed as criteria when examining bearer path compliance with carrier policies. Costing a route (e.g., computing a route cost) generally includes determining a total route cost comprising the cost of each segment of a route. Cost computations can include bandwidth, network delay, hop count, path cost, load, maximum transmission unit (MTU), reliability, communication cost, etc. In an aspect, COR component 364, can compute total cost or partial cost for one or more bearer paths. For example, COR component 364 can compute a partial route cost for an EDGE path segment from a UE to a carrier. Similarly, for example, COR component 364 can compute a route cost from a UE to a destination server including a WiFi path segment. One of skill in the art will appreciate that any of the numerous different costing algorithms can be employed to facilitate computation of route or partial route costs. In another aspect, COR component 364 can merely compile and source costing data for one or more possible bearer paths (e.g., the actual cost computation can be, at least partially, executed by other components (not illustrated) communicatively coupled to system 300).

Bearer path characteristics component 366 can facilitate access to information related to the characteristics of one or more bearer paths or segments thereof. Bearer path characteristic information can be employed as criteria when examining bearer path compliance with carrier policies. In general, bearer path characteristics are related to the characteristics of the comprising path segments. Paths and path segments can each be interrogated to determine various associated characteristics. These characteristics can include latency, speed, data compressibility, MTU, direction, acknowledgement, type, traffic, terminus, hop count, load, capacity, jitter, loss, expected data rate, radio information, signal to noise ratio, nodes/topology, geography, connectivity, history, status, billing info, etc. Other characteristics can be related to a bearer path or segments thereof but are unrelated to interrogation of the physical path segment, including user histories, inferences related to the future status or condition of a bearer path or segment thereof, UE information, market forces, carrier business information, etc. For example, a characteristic can identify that a bearer path includes path segments carried on a competing network, that it is anticipated that 3G service will be heavily burdened at a particular time and place based on historical use data, etc.

Bearer path information component 360 can source information from bearer path feature request component 362, cost-of-route component 364, bearer path characteristics component 366, or combinations thereof. Where this information is accessible to policy compliance component 330, determinations of preferential bearer paths can be facilitated. These determinations can be accessed by bearer path switch component 370.

Bearer path switch component 370 can include complex bearer path component 372. Complex bearer path component 372 can facilitate selection of one or more complex bearer path schema. Complex bearer path schema can comprise asymmetric routing across bearer paths, bonding bearer path resources together, multiplexing across bearer path resources, etc. As a non-limiting example, a complex bearer path scheme can include a bearer path having a 3G path segment for outbound traffic and a WiFi path segment for inbound traffic. As an additional non-limiting example, a complex bearer path scheme can include a secure bearer path, a specific bank router, and exclude all foreign hops for content designated as banking data and include a WiFi segment for undesignated content. One of skill in the art will appreciate that nearly any complex bearer path scheme can be generated to facilitate selection of designated preferential bearer paths, or segments thereof, and that all such complex bearer path schema are within the scope of the subject disclosure.

Figure 4:
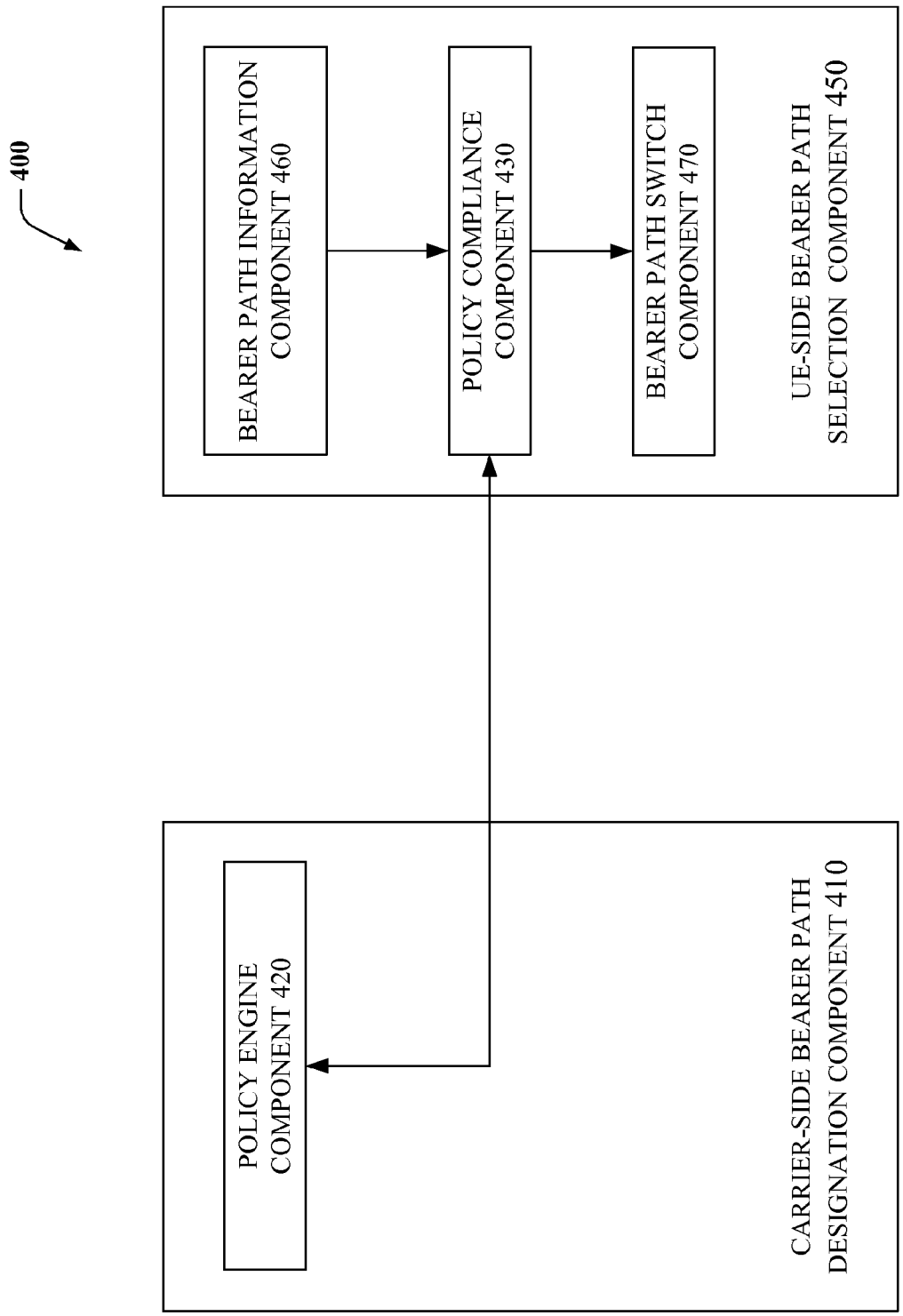
FIG. 4 depicts an exemplary system that facilitates carrier-driven bearer path selection in accord with aspects of the disclosed subject matter.

FIG. 4 depicts an exemplary system 400 that facilitates carrier-driven bearer path selection in accord with aspects of the disclosed subject matter. System 400 can include carrier-side bearer path designation component 410. Carrier-side bearer path designation component 410 can be the same as, or similar to, carrier-side bearer path designation components 110, 210, 310. Carrier-side bearer path designation component 410 can be communicatively coupled to UE-side bearer path selection component 450 by way of a communication framework (not illustrated) which can be the same as, or similar to, communications framework 190. UE-side bearer path selection component 450 can be the same as, or similar to, UE-side bearer path selection components 150, 250, 350.

System 400 illustrates policy compliance component 430 located with the UE-side selection component 450 in comparison to system 200 in which policy compliance component 230 can be located with the carrier-side selection component 210. Policy compliance, as disclosed herein, relates to designating preferential bearer paths based, at least in part, on carrier-generated policies pertaining to bearer path selection. From the UE-side, policy compliance component 430 can access policies being sourced by policy engine component 420 on the carrier-side. As such, designation of preferential bearer paths can occur UE-side but remain dependant on policies generated by a carrier. It is anticipated that carrier-side policies can be sourced by policy engine component 420 and those policies can be stored at alternate locations (e.g. $3^{rd}$ party servers, local mirrors, shared libraries, etc., not illustrated) before they are accessed by policy compliance component 430, without departing from the scope of the subject disclosure.

UE-side bearer path selection component 450 can include bearer path information component 460. Bearer path information component 460 can be the same as, or similar to, bearer path information components 260, 360. Policy compliance component 430 can be communicatively coupled to bearer path information component 460. Bearer path information component 460 can facilitate access to bearer path related information. Bearer path information can comprise bearer path identification, bearer path characteristic(s), bearer path cost-of route (COR) information pertaining to the content to be borne, feature requests for designated bearer paths, and requests for specific bearer paths or portions thereof, etc, as previously disclosed. Whereas bearer path information component 460 can be communicatively coupled to policy compliance component 430, information relating to the bearer paths and bearer path conditions can be compared to carrier policies. This can facilitate ranking lists of bearer paths to drive the bearer path selection process on a UE.

UE-side bearer path selection component 450 can further include bearer path switch component 470. Bearer path switch component 470 can be the same as, or similar to, Bearer path switch components 270, 370. Bearer path switch component 470 can facilitate selection of a bearer path at a UE. Selection of a bearer path at a UE by bearer path switch component 470 can be based, at least in part, on compliance and ranking information for a bearer path in a manner that is the same as, or similar to, that disclosed elsewhere herein. Compliance and ranking information can be accessed by way of policy compliance component 430 also in a manner that is the same as, or similar to, that disclosed elsewhere herein.

FIGS. 5 through 8 depict exemplary methods in accordance with the disclosed subject matter. While, for purposes of simplicity of explanation, the methods are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methods disclosed hereinafter and throughout this specification are capable of being stored on an article of manufacture or other computer readable storage medium to facilitate transporting and transferring such methods to computers.

Figure 5:
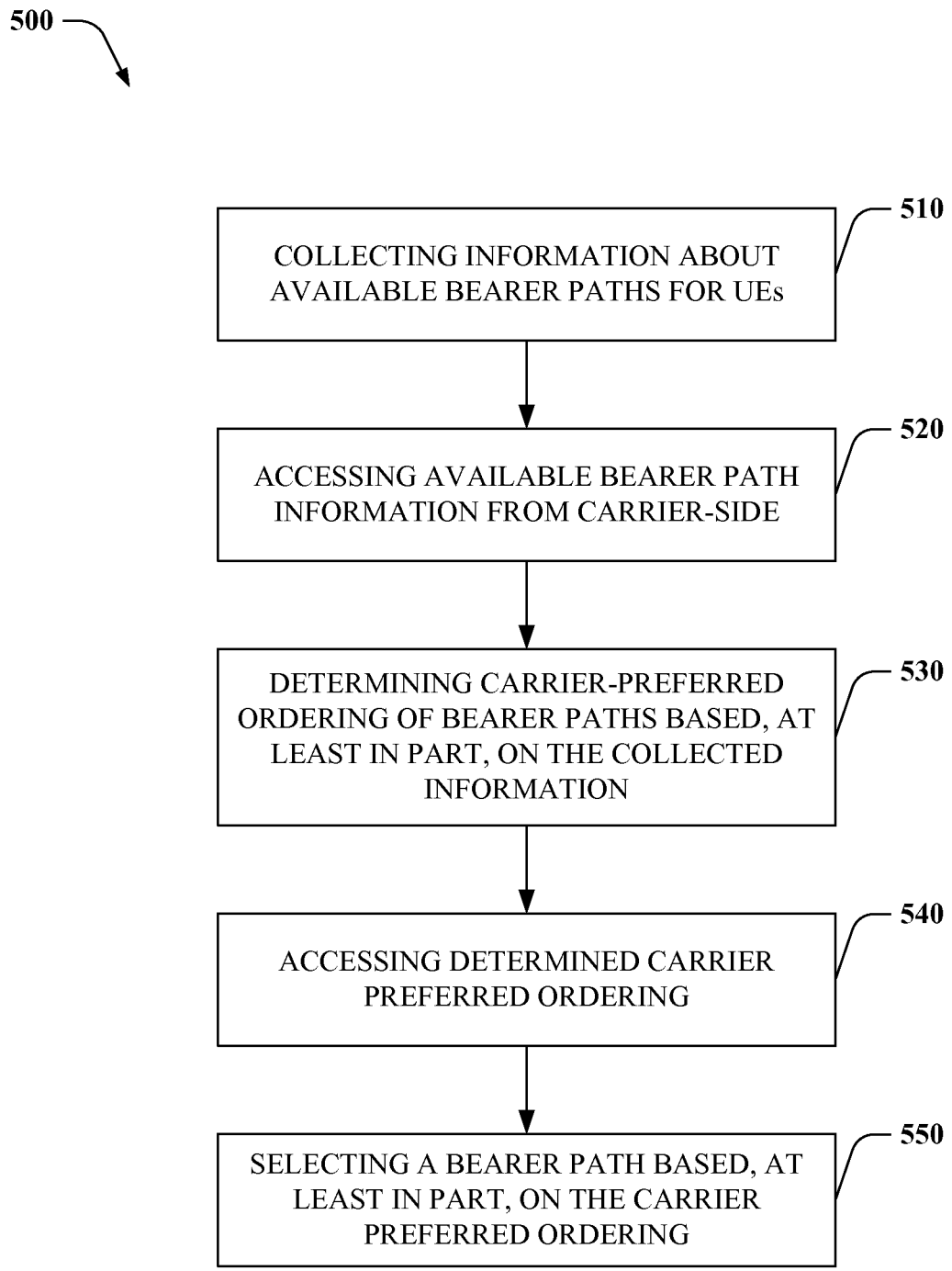
FIG. 5 illustrates an exemplary method facilitating carrier-driven bearer path selection in accord with aspects of the disclosed subject matter.

FIG. 5 illustrates an exemplary methodology 500 facilitating carrier-driven bearer path selection in accord with aspects of the disclosed subject matter. At 510, information can be collected pertaining to available bearer paths identified for UEs. At 520, the information about the available bearer paths can be accessed by the carrier-side systems. At 530, a preferential ordering of the identified bearer paths can be determined. This ordering can be based, at least in part, on the information collected at 510 and accessed at 520. At 540, the determined preferential order can be accessed. At 550, a bearer path can be selected based at least in part on the determined favored order of the carrier from 530. At this point, methodology 500 can end.

In an aspect, the determination of the carrier's preferential ordering of the bearer paths can be based on carrier policies as disclosed hereinabove. An ordered list of bearer paths, e.g., as determined at 530, can be accessed for selection of a preferential bearer path either at the carrier-side or at the UE-side, as discussed with regard to FIGS. 2 and 4 hereinabove. In an aspect, bearer path designation can occur carrier-side and the carrier-side designation can be accessed by the UE to facilitate UE-side selection of a bearer-path at the UE (e.g., as illustrated for systems 200 and 300). In another aspect, bearer path designation can occur UE-side, that is, carrier-side preference information can be accessed from a UE such that a UE-side designation of a bearer path occurs at the UE and is employed in selecting a bearer path, also at the UE (e.g., as illustrated for systems 400). In a further aspect, information collected at 510 can include information relating to bearer path feature requests, route costing, bearer path characteristics, or combinations thereof as disclosed hereinabove. Thus methodology 500 can facilitate selecting a bearer path, for example, that reflects a user's desire to employ a secure bearer path, a carrier business goal to avoid path segments over competitor equipment, an inferred heavy traffic path segment, etc.

In an additional aspect, methodology 500 can facilitate selection of complex bearer path schema as disclosed hereinabove. Access, at 540, and selection, at 550, can reflect dynamic adaptation of a bearer path in accord with a determined complex bearer path scheme. As such, methodology 500 can select, for example, a bearer path that comprises a bound plurality of channels, a high bandwidth bearer path to multiplex across, etc.

Figure 6:
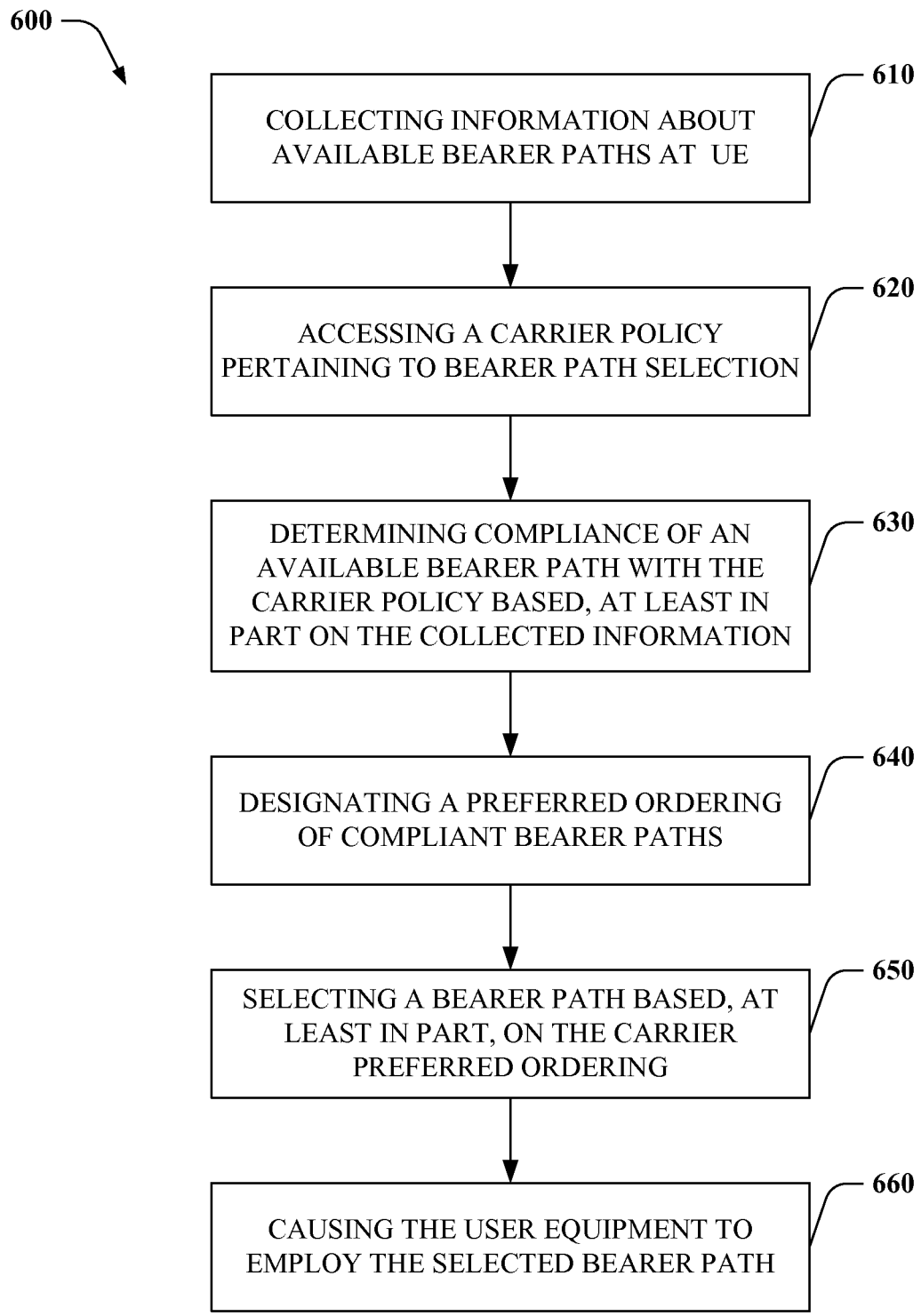
FIG. 6 an exemplary method facilitating carrier-driven bearer path selection in accord with aspects of the disclosed subject matter.

FIG. 6 illustrates an exemplary methodology 600 facilitating carrier-driven bearer path selection in accord with aspects of the disclosed subject matter. At 610, information can be collected pertaining to available bearer paths identified at a UE. Collected information can include information relating to bearer path feature requests, COR, bearer path characteristics, or combinations thereof as disclosed hereinabove. At 620, carrier policy pertaining to bearer path selection can be accessed. At 630, bearer path compliance with the carrier-based policy can be determined. This determination can be based, at least in part, on information collected at 610. At 640, a preferential ordering of compliant bearer paths can be designated. At 650, a bearer path can be selected based, at least in part, on the preferred order designated at 640. At 660, the UE can be caused to employ the selected bearer path from 650. At this point, methodology 600 can end.

In an aspect, carrier policies can be generated that consider a nearly limitless number of criteria as disclosed hereinabove. As disclosed with regard to methodology 600, carrier policies can be accessed, for example, by way of a policy engine as in systems 200, 300 and 400. Further, policies can be accessed by way of other components such as carrier policies stored on $3^{rd}$ party servers, carrier policies stored on UE memories, carrier policies stored on path segment equipment (e.g., routers, servers, RANs (radio access networks), femto-cells, etc.), carrier policies stored at shared memory locations and/or mirrors, etc. It is anticipated that carrier policies can be sourced from a policy engine as in systems 200, 300, and 400, said policies being cached on a UE, such that if the UE is unable to effectively communicate with the carrier-side components, the cached policies can be employed in selecting a bearer path, without departing from the scope of the present disclosure.

Figure 7:
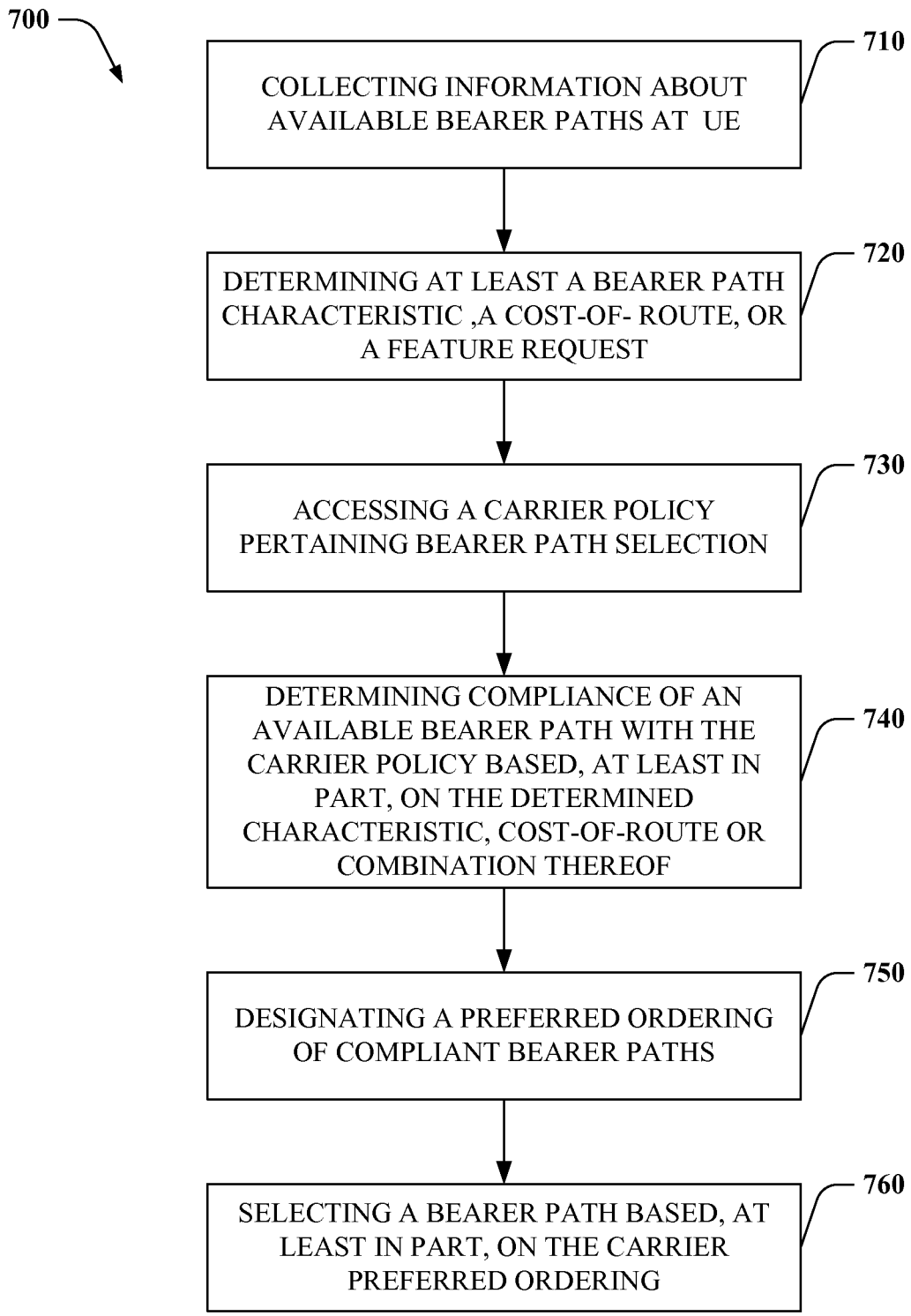
FIG. 7 illustrates an exemplary method facilitating employing carrier-driven bearer path selection in accord with aspects of the disclosed subject matter.

FIG. 7 illustrates an exemplary methodology 700 facilitating carrier-driven bearer path selection in accord with aspects of the disclosed subject matter. At 710, information can be collected pertaining to available bearer paths identified at a UE. At 720, information relating to bearer path feature requests, COR, or bearer path characteristics, as disclosed hereinabove, can be determined. In an aspect, this information can be determined from the information collected at 710. At 730, a carrier policy pertaining to bearer path selection can be accessed. At 740, bearer path compliance with the carrier-based policy can be determined. This determination can be based, at least in part, on a bearer path feature request, COR, or bearer path characteristic collected at 720. At 750, a preferential ordering of compliant bearer paths can be designated. At 760, a bearer path can be selected based, at least in part, on a desired order designated at 750. At this point, methodology 700 can end.

Figure 8:
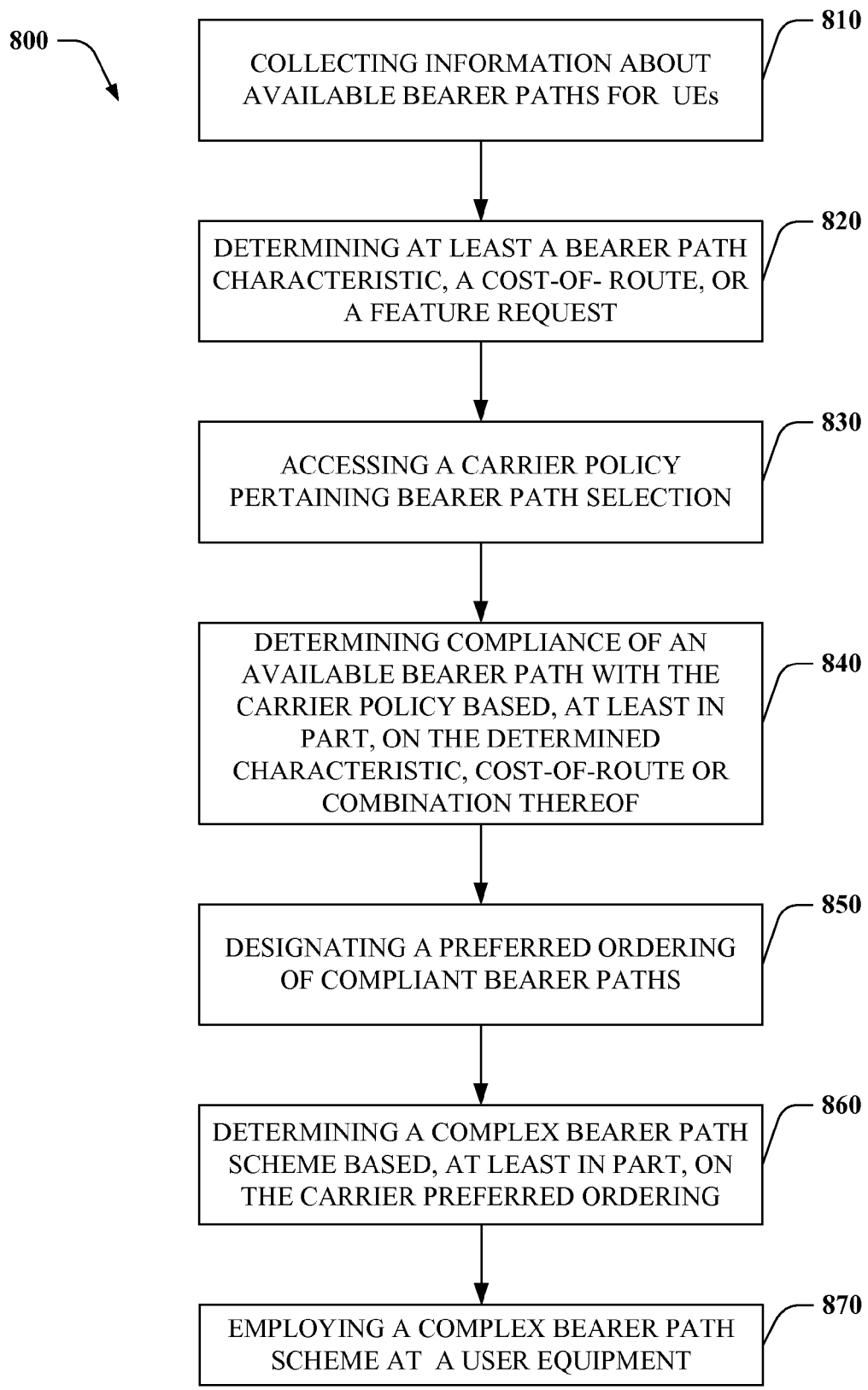
FIG. 8 depicts an exemplary method facilitating employing carrier-driven bearer path selection in accord with aspects of the disclosed subject matter.

FIG. 8 illustrates an exemplary methodology 800 facilitating carrier-driven bearer path selection in accord with aspects of the disclosed subject matter. At 810, information can be collected pertaining to available bearer paths identified at a UE. At 820, information relating to bearer path feature requests, COR, or bearer path characteristics, as disclosed hereinabove, can be determined. At 830, a carrier policy pertaining to bearer path selection can be accessed. At 840, bearer path compliance with the carrier-based policy can be determined. This determination can be based, at least in part, on a bearer path feature request, COR, or bearer path characteristic collected at 820. At 850, a preferential ordering of compliant bearer paths can be designated. At 860, a complex bearer path scheme can be determined based, at least in part, on the preferred order designated at 850. A complex bearer path can be the same as, or similar to, that described with respect to systems 100, 200, 300, or 400. At 870, a UE can employ a determined complex bearer path scheme. At this point, methodology 800 can end.

Figure 9:
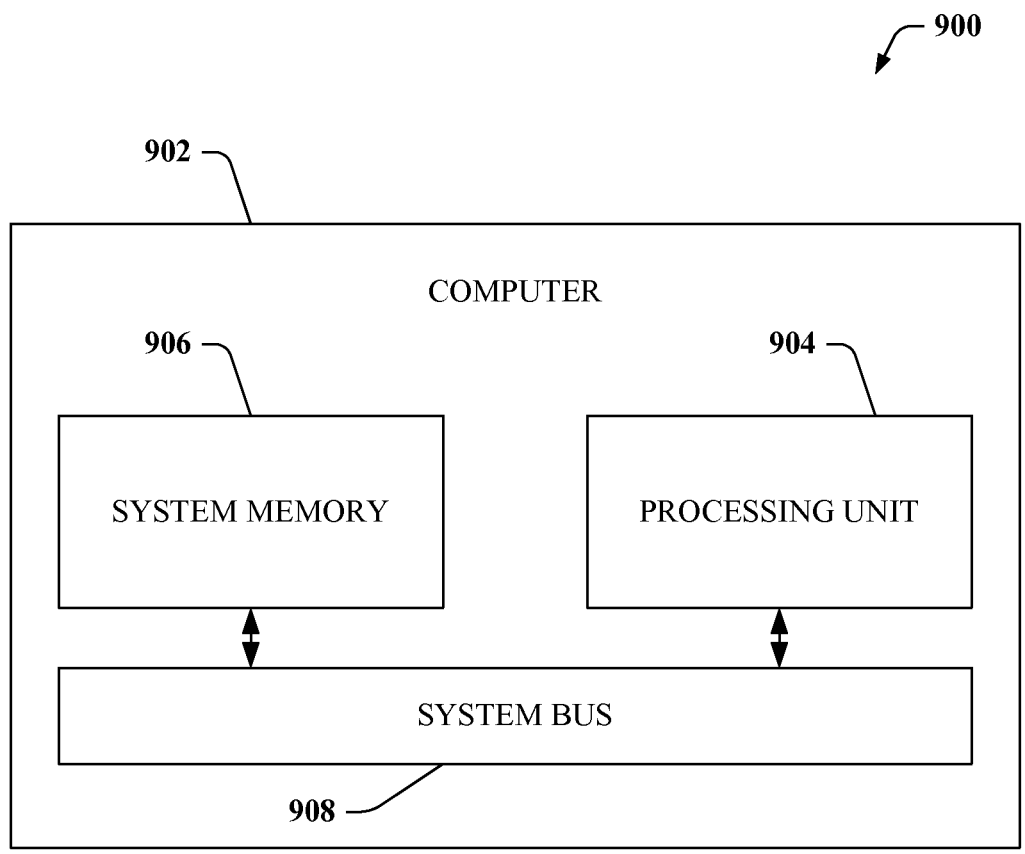
FIG. 9 illustrates a sample operating environment that can facilitate carrier-driven bearer path selection in accord with aspects of the disclosed subject matter.

In order to provide additional context for various aspects of the disclosed subject matter, FIG. 9 and the following discussion are intended to provide a brief, general description of a suitable computing environment 900 in which the various aspects described herein can be implemented. While the description above is in the general context of computer-executable instructions that can run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. As a non-limiting example, policy engine component 220 can be implemented as one or more program modules, can be hardware executing one or more routines or accessing one or more data structures, etc., in facilitating access to carrier-side bearer path policies. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. As a non-limiting example, carrier side bearer path designation component 110 can be distributed across a carrier network by implementing sub components at a plurality of radio controllers in the network. In another non-limiting example, UE-side bearer path selection component 150 can be distributed across several UEs, for example, bearer path information components can be located in a user's car, laptop, smartphone, pager, watch, and GPS feeding bearer path information back to a policy compliance component on the user's home PC. Numerous other examples of distributed computing for the various aspects of the disclosed subject matter can easily be envisioned and are all considered within the scope of the disclosed subject matter even where not explicitly recited. In a distributed computing environment, program modules can be located in both local and remote memory storage devices. For example, costing computations can be performed by a $3^{rd}$ party, policy compliance can be performed in parallel across a plurality of processors, etc.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the exemplary environment 900 for implementing various aspects includes a computer 902, the computer 902 including a processing unit 904, a system memory 906 and a system bus 908 (for example a smartphone, RAN, NodeB, laptop, GPS, wireless router or gateway, smart dog collar, smart appliance, etc.) The system bus 908 couples system components including, but not limited to, the system memory 906 to the processing unit 904. The processing unit 904 can be any of various commercially available processors, such a single core processor, a multi-core processor, or any other suitable arrangement of processors. The system bus 908 can be any of several types of bus structure that can further interconnect to a memory bus (with or without a memory controller), a peripheral bus, and a local bus using any of a variety of commercially available bus architectures. The system memory 906 can include read-only memory (ROM), random access memory (RAM), high-speed RAM (such as static RAM), EPROM, EEPROM, and/or the like. Additionally or alternatively, the computer 902 can include a hard disk drive, upon which program instructions, data, and the like can be retained. Moreover, removable data storage can be associated with the computer 902. Hard disk drives, removable media, computer-readable storage media, etc. can be communicatively coupled to the processing unit 904 by way of the system bus 908.

The system memory 906 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 902 through one or more wired/wireless input devices, such as a keyboard, pointing and clicking mechanism, pressure sensitive screen, microphone, joystick, stylus pen, etc. A monitor or other type of interface can also be connected to the system bus 908 (e.g., a touch screen on a smartphone or GPS to select desired bearer path features, a joystick in a car to input bearer path preferences, etc.)

The computer 902 can operate in a networked environment using logical connections byway of wired and/or wireless communications to one or more remote computers, phones, or other computing devices, such as workstations, server computers, routers, personal computers, portable computers, microprocessor-based entertainment appliances, peer devices or other common network nodes, etc. As a non-limiting example, a wireless router can include UE-side bearer path selection component 150 and can communicate wirelessly with one or more laptops to facilitate determining a bearer path selection for each laptop. The computer 902 can connect to other devices/networks by way of antenna, port, network interface adaptor, wireless access point, modem, and/or the like.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi or Bluetooth wireless technologies. Thus, the communication can be a predefined structure as with a conventional network or simply an ad hoc communication between at least two devices.

WiFi, or Wireless Fidelity, allows connection to the Internet, for example, from a couch at home, a bed in a hotel room, or a conference room at work, all without wires. WiFi is a wireless technology similar to that used in a cell phone that enables such devices, e.g., computers, to send and receive data indoors and out, anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
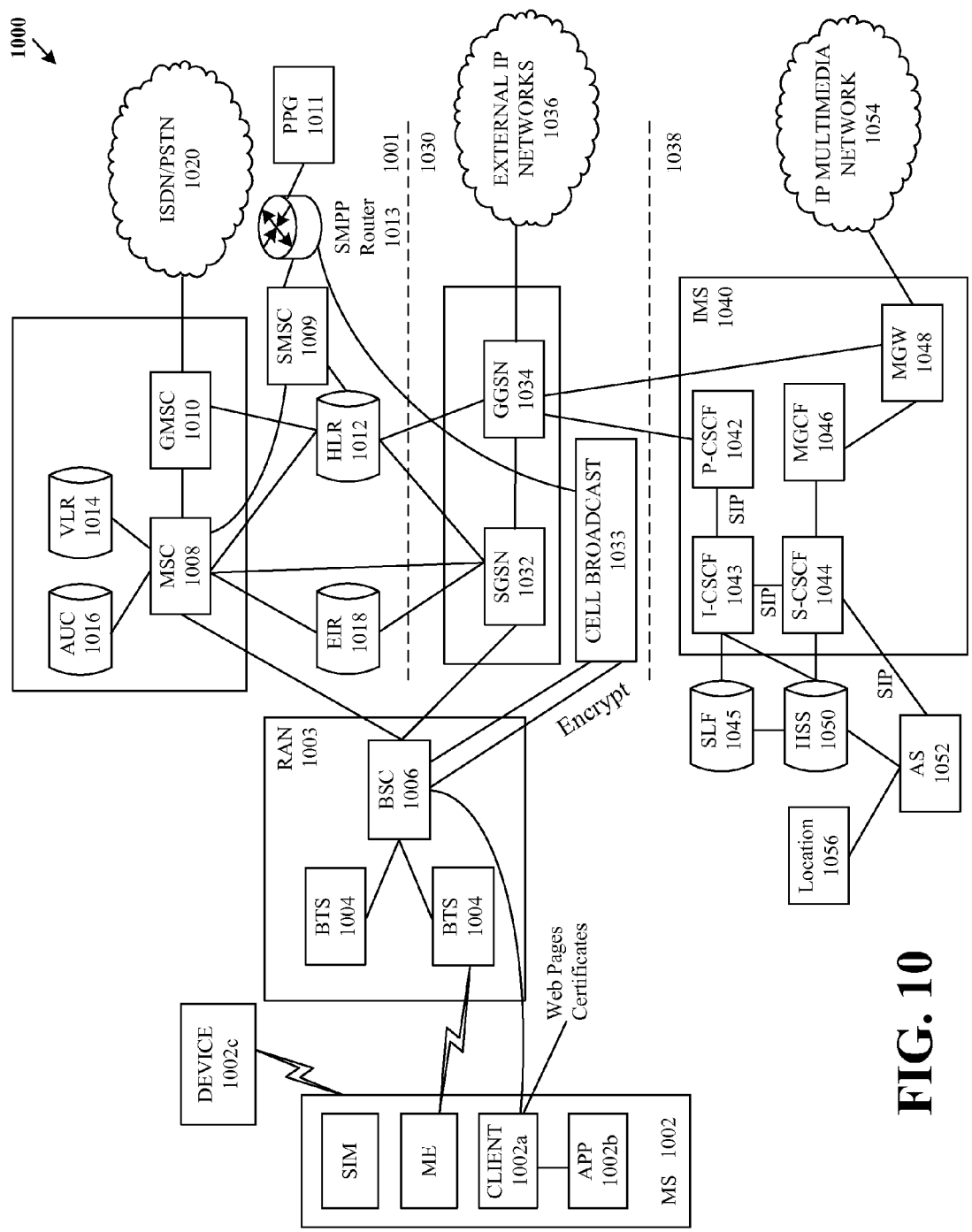
FIG. 10 depicts a sample network-environment for effectuating mobile communication in accord with aspects of the subject innovation.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment, Mobile Equipment (ME) or network enabled UE, such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA and is discuss more fully below. As a non-limiting example, an MS can be a smartphone that facilitates selection of designated bearer paths as disclosed herein in compliance with a GSM carrier's preferences.

The embedded client 1002a communicates with an application 1002b that provides services and/or information to an end user. One example of the application can be navigation software that provides near real-time traffic information that is received via the embedded client 1002a to the end user. The navigation software can provide road conditions, suggest alternate routes, etc. based on the location of the MS 1002. Another example can be a bear path feature selection application that allows other software to indicate desirable bearer path features by way of an embedded client to the carrier such that these preferences can be considered in light of carrier policies regarding bearer path selection. Those of ordinary skill in the art understand that there are many different methods and systems of locating an MS 1002.

Alternatively, the MS 1002 and a device 1002c can be enabled to communicate via a short-range wireless communication link, such as Bluetooth. For example, a Bluetooth SIM Access Profile can be provided in an automobile (e.g., device 1002c) that communicates with the SIM in the MS 1002 to enable the automobile's communications system to pull information from the MS 1002. The Bluetooth communication system in the vehicle becomes an "embedded phone" that employs an antenna associated with the automobile. The result is improved reception of calls made in the vehicle. As one of ordinary skill in the art would recognize, an automobile is one example of the device 1002c. There can be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls. Bearer path selection information can be communicated to these entities to facilitate transmission of content over a selected bearer path, both inside the GPRS network and upon exiting the GPRS network, for example when transport includes a public data network.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the disclosed subject matter. It is, of course, not possible to describe every conceivable combination of components or methods for purposes of describing the disclosed subject matter, but one of ordinary skill in the art can recognize that many further combinations and permutations of such matter are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a memory that stores executable instructions; and
a processor, coupled to the memory, that facilitates execution of the executable instructions to perform operations, comprising:
receiving, from a user equipment, bearer path information related to a bearer path of a set of bearer paths available for communication between another device and the user equipment, wherein the bearer path information comprises cost information representing a route cost related to a cost of using the bearer path, ranking information related to a rank of the bearer path, and
identification information identifying a preferred bearer path to communicate between the other device and the user equipment based on the ranking information;
determining, by the device, a compliance value based on carrier policy information representative of a carrier policy and the preferred bearer path; and
enabling, via the device, access to the compliance value by the user equipment to facilitate selection of the bearer path of the set of bearer paths by the user equipment.

2. The device of claim 1, wherein the bearer path of the set of bearer paths comprises a bearer path segment related to a wireless device of a wireless communications network.

3. The device of claim 1, wherein the ranking information is based on other policy information representing the ranking policy received at the user equipment from a network device.

4. The device of claim 1, wherein the ranking information is based on determining, by the user equipment, another level of compliance between a criterion of the ranking policy and a characteristic of the bearer path.

5. The device of claim 1, wherein a bearer path of the set of bearer paths comprises a bearer path segment related to a near-field communication device.

6. The device of claim 1, wherein a bearer path of the set of bearer paths comprises a bearer path segment related to a personal area network device.

7. The device of claim 6, wherein the personal area network device comprises a wireless personal area network device.

8. The device of claim 1, wherein a bearer path of the set of bearer paths comprises bearer path segments between the other device and the user equipment.

9. The device of claim 8, wherein the bearer path segments comprise a wireless bearer path segment.

10. The device of claim 1, wherein the ranking information is based on policy data representing a ranking policy received from a data store co-located with a network device.

11. The device of claim 1, wherein the ranking information is based on policy data representing a ranking policy received from a data store remotely located from a network device.

12. The device of claim 1, wherein the cost information is based on information representing a delay in accessing the bearer path relative to another delay in accessing another bearer path.

13. A method, comprising:
receiving, by a user equipment comprising a processor, bearer path information relating to a set of bearer paths available to communicate data between a device and the user equipment, wherein the set of bearer paths comprise a wireless bearer path segment;
determining, by the user equipment, a route cost related to a cost of using the bearer path;
determining, by the user equipment, an ordering of the set of bearer paths based on the bearer path information and the route cost;
determining, by the user equipment, a first bearer path of the set of bearer paths for communication between the device and the user equipment;
receiving, at the user equipment, selection information in response to sharing preferred path information, related to the first bearer path, with a carrier device associated with an identity of a carrier; and
determining, by the user equipment, a second bearer path of the set of bearer paths, based on the preferred path information and the selection information, for communication between the user equipment and the device.

14. The method of claim 13, wherein the determining the ordering comprises receiving policy data representing a ranking policy pertaining to ranking a bearer path of the set of bearer paths based on the bearer path information and a ranking criterion determined by programming input received by a network device.

15. The method of claim 13, wherein the receiving the bearer path information comprises receiving the bearer path information associated with a near-field communication bearer path segment related to a near-field communication device.

16. The method of claim 13, wherein the receiving the bearer path information comprises receiving the bearer path information associated with a personal area network bearer path segment related to a personal area network device.

17. A non-transitory computer readable medium having executable instructions stored thereon that, in response to execution, cause a first device comprising a processor to perform operations, comprising:
receiving bearer path information related to a set of bearer paths available for communication between the first device and a second device, wherein the bearer path information comprises a cost of using a bearer path of the set of bearer paths;
determining a ranking policy based on a characteristic of the set of bearer paths determined from the bearer path information and the cost;

determining a rank for a bearer path of the set of bearer paths based on the ranking policy, the bearer path information, and the cost;

designating a first bearer path of the set of bearer paths for transmitting data to the second device based on the rank;

receiving selection information from a carrier device of a wireless carrier network in response to sharing preferred path information, related to the first bearer path, with the carrier device; and designating a second bearer path of the set of bearer paths, based on the preferred path information and the selection information, for communication between the first device and the second device.

18. The non-transitory computer readable medium of claim 17, wherein the receiving the bearer path information comprises receiving the bearer path information associated with a bearer path segment related to a near-field communication device.

19. The non-transitory computer readable medium of claim 17, wherein the receiving the bearer path information comprises receiving the bearer path information associated with a bearer path segment related to a personal area network device.

20. A user equipment, comprising:

a memory to store executable instructions; and a processor, coupled to the memory, that facilitates execution of the executable instructions to perform operations, comprising:

receiving a ranking policy related to ranking a set of bearer paths between a device and the user equipment;

receiving bearer path information related to the set of bearer paths, wherein the bearer path information comprises a cost of using a bearer path of the set of bearer paths;

determining a rank for a bearer path of the set of bearer paths based on the bearer path information and the ranking policy;

determining a first bearer path of the set of bearer paths between the user equipment and the device based on the rank;

receiving selection information from a carrier device of a wireless carrier network in response to sharing preferred path information, related to the first bearer path, with the carrier device: and determining a second bearer path of the set of bearer paths between the user equipment and the device based on the preferred path information and the selection information.

21. The user equipment of claim 20, wherein the receiving the bearer path information comprises receiving the bearer path information associated with a bearer path segment related to a wireless personal area network device.

* * * * *